United States Patent
Kumar et al.

(10) Patent No.: US 10,733,372 B2
(45) Date of Patent: Aug. 4, 2020

(54) DYNAMIC CONTENT GENERATION

(71) Applicant: Microsoft Technology Licensing, LLC, Redmond, WA (US)

(72) Inventors: Sujeet Kumar, Mountain View, CA (US); Dipak Kumar Mangal, Mountain View, CA (US); Sanjay Singh Thakur, Madhya Pradesh (IN); Daniel Albert Swett, Mountain View, WA (US); Eric Hawlen Mao, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 15/402,989

(22) Filed: Jan. 10, 2017

(65) Prior Publication Data

US 2018/0196784 A1     Jul. 12, 2018

(51) Int. Cl.
*G06F 40/186*     (2020.01)
*G06F 3/0482*     (2013.01)
*G06F 16/438*     (2019.01)

(52) U.S. Cl.
CPC .......... *G06F 40/186* (2020.01); *G06F 3/0482* (2013.01); *G06F 16/4393* (2019.01)

(58) Field of Classification Search
CPC ............. G06F 17/248; G06F 17/30056; G06F 3/0482; G06F 17/212; G06F 40/186; G06F 3/04842; G06F 16/40; G06F 16/4393; H04L 41/22
See application file for complete search history.

(56) References Cited

U.S. PATENT DOCUMENTS

| | | | |
|---|---|---|---|
| 9,449,109 B1* | 9/2016 | Keel | G06F 16/9537 |
| 2003/0222900 A1* | 12/2003 | Schramm-Apple | G06F 19/324 715/730 |

(Continued)

OTHER PUBLICATIONS

Kunesh, Andrew, "Beyond PowerPoint & Keynote: The 20 Best Presentation Apps", https://zapier.com/blog/best-powerpoint-alternatives/, Published on: Oct. 28, 2014, 36 pages.

(Continued)

*Primary Examiner* — Sherrod L Keaton

(57) ABSTRACT

Non-limiting examples of the present disclosure describe electronic document generation, where an electronic document of an application/service may be dynamically generated in a manner that is tailored specifically for a user. A query may be received that comprises a topic for generation of a slide-based visual presentation. The query is processed. In some examples, slide content suggestions may be generated and presented to a user based on the query processing. Content for a processed query may be retrieved by a plurality of data service providers that are connected with the visual presentation service via a distributed network. An electronic document may be generated for the slide-based visual presentation. The electronic document is specifically tailored for a user and dynamically generated based on one or more of: the processing of the query, the retrieved content, a selection of one or more slide content suggestions and an evaluation of signal data associated with the user.

20 Claims, 9 Drawing Sheets

(56) References Cited

U.S. PATENT DOCUMENTS

| | | | |
|---|---|---|---|
| 2006/0132456 A1* | 6/2006 | Anson | G06F 3/0488 |
| | | | 345/173 |
| 2007/0022384 A1 | 1/2007 | Abbott et al. | |
| 2008/0040340 A1 | 2/2008 | Varadarajan et al. | |
| 2008/0092051 A1* | 4/2008 | Sidon | G06F 16/9038 |
| | | | 715/731 |
| 2008/0120535 A1 | 5/2008 | Lynton | |
| 2009/0006369 A1 | 1/2009 | Guday et al. | |
| 2009/0012880 A1 | 1/2009 | Tortola | |
| 2009/0327896 A1 | 12/2009 | Pall et al. | |
| 2010/0318916 A1 | 12/2010 | Wilkins | |
| 2012/0229446 A1 | 9/2012 | Hyndman et al. | |
| 2013/0111373 A1 | 5/2013 | Kawanishi et al. | |
| 2013/0191754 A1* | 7/2013 | Rose | G06F 16/51 |
| | | | 715/732 |
| 2013/0198636 A1* | 8/2013 | Kief | G06F 17/2241 |
| | | | 715/730 |
| 2014/0082485 A1 | 3/2014 | Deluca et al. | |
| 2014/0380171 A1* | 12/2014 | Maloney | G06F 3/04847 |
| | | | 715/732 |
| 2015/0006497 A1* | 1/2015 | Chetzroni | G06F 16/951 |
| | | | 707/706 |
| 2015/0007005 A1 | 1/2015 | Edge et al. | |
| 2015/0058310 A1 | 2/2015 | Mukherjee et al. | |

OTHER PUBLICATIONS

Shattuck, Susannah, "How to Turn Your Boring Slide Deck Into a Dynamic Prezi", https://blog.prezi.com/how-to-turn-your-boring-slide-deck-into-a-dynamic-prezi/, Published on: May 2, 2016, 12 pages.

* cited by examiner

100

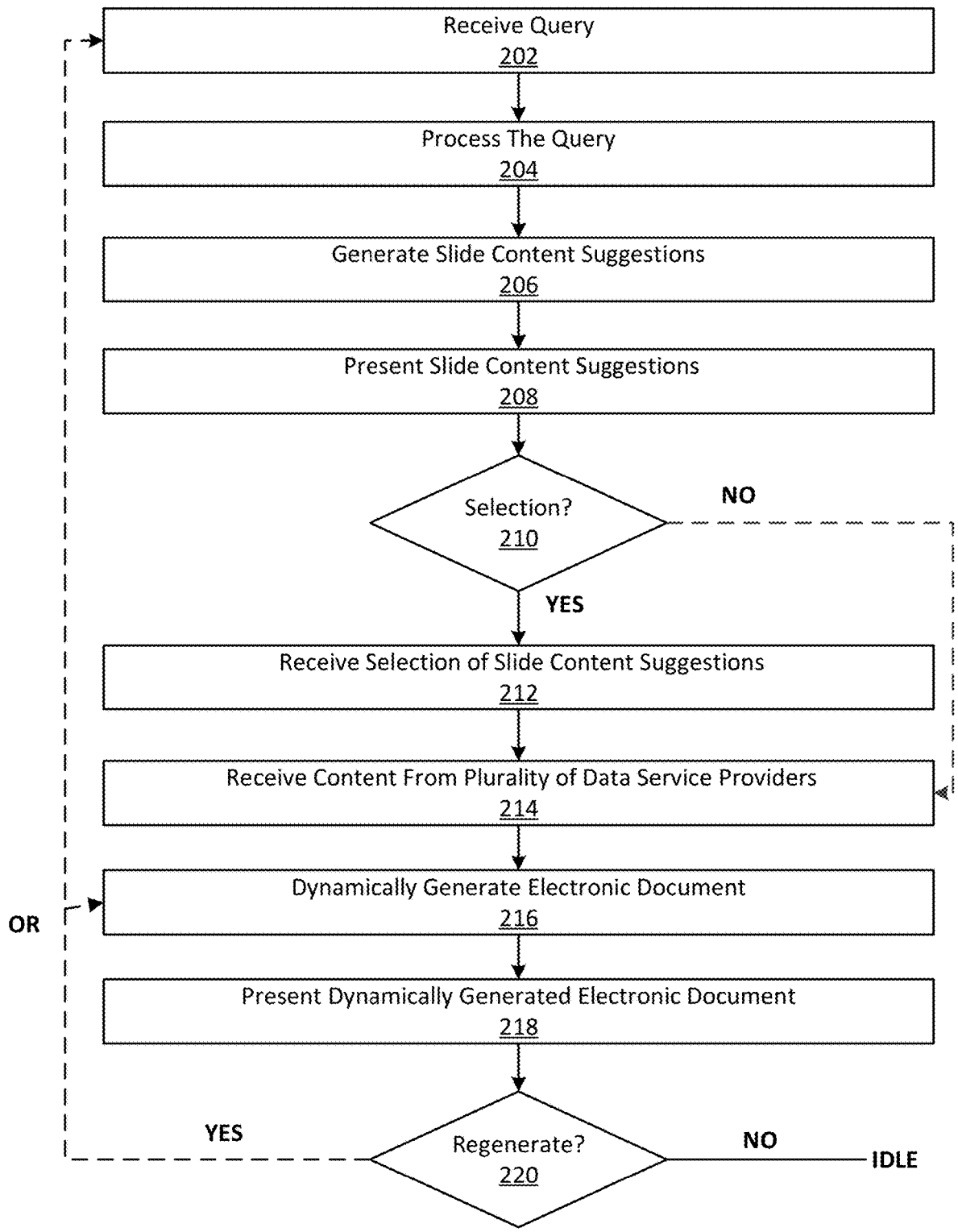

300

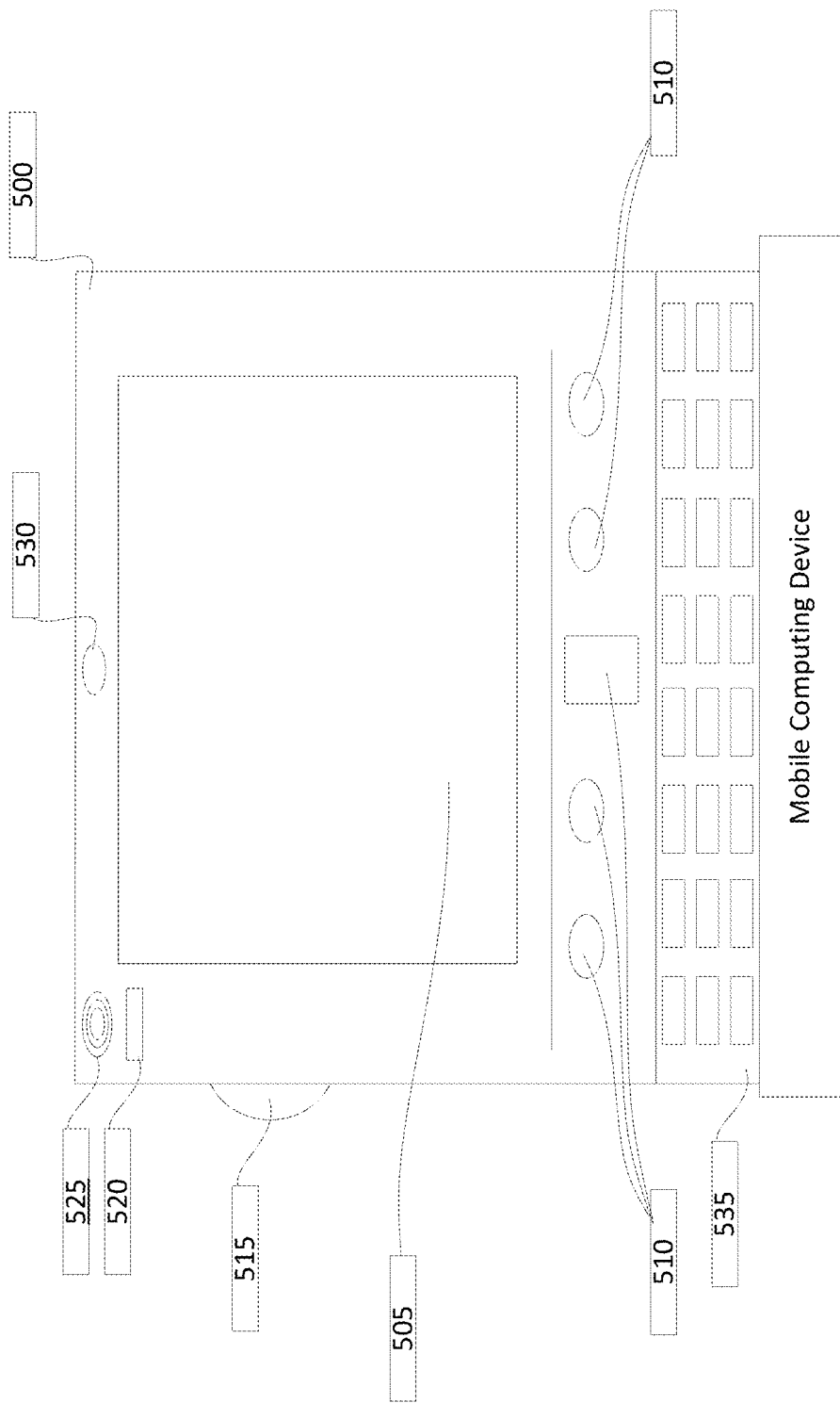

DYNAMIC CONTENT GENERATION

BACKGROUND

Currently, visual presentation programs such as POWERPOINT® rely on static, pre-generated templates for creation of a slide-show presentation. A user can select a particularly themed, pre-generated template. However, context for content included in a pre-generated template is not provided within the template. Instead, a user is required to select a pre-generated template and then manually add content and context to the template. In doing so, users are typically required to extensively modify the pre-generated template including: manipulating formatting of the pre-generated template, deleting pre-populated content that is not of interest for the user and accessing outside resources (e.g. other application/services) to find and import content that is of interest to the user. This is both tedious and inefficient for a user.

As such, examples of the present application are directed to the general technical environment related to improving processing efficiency for user, application and devices where documents can be dynamically generated and tailored specifically for a user.

SUMMARY

Non-limiting examples of the present disclosure describe dynamic content generation, where an electronic document for an application/service may be dynamically generated in a manner that is tailored specifically for a user. An example application/service may be a visual presentation service that provides slide-based visual presentations. However, examples described herein may relate to content generation for any type of application/service including productivity applications. A productivity application is any application/service that is utilized to provide and management an exemplary electronic document. An electronic document is a record of content presented in an electronic format. As examples, an electronic document may comprise but is not limited to: files including presentation files, webpages and media objects, among other examples.

An exemplary visual presentation service may be configured to provide user interface features that enable dynamic generation of an electronic document for a slide-based visual presentation. A query may be received, where the query comprises a topic for generation of a slide-based visual presentation. The query is processed. In some examples, slide content suggestions may be generated and presented to a user based on the query processing. Content may be received for the processed query. The content may be retrieved by a plurality of data service providers that are connected with the visual presentation service via a distributed network. An electronic document may be generated for the slide-based visual presentation. The electronic document is specifically tailored for a user and dynamically generated based on one or more of: the processing of the query, the retrieved content, a selection of one or more slide content suggestions and an evaluation of signal data associated with the user. As an example, a dynamically generated electronic document may be a customized template of slide content presented through a visual presentation program. In further examples, the dynamically generated electronic document may comprise suggestions/recommendations for the user, for example, regarding to content to review and consider for inclusion within the slide-based visual presentation. In some instances, exemplary suggestions/recommendations for the user may be interactive including hyperlinks and rich media objects, among other examples. In further examples, the electronic document may be configured for dynamic update, where suggestions or content updates may be provided through the user interface of the visual presentation service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 is an exemplary method related to dynamic generation of an electronic document with which aspects of the present disclosure may be practiced.

FIGS. 5A and 5B are simplified block diagrams of a mobile computing device with which aspects of the present disclosure may be practiced.

DETAILED DESCRIPTION

Figure 1:
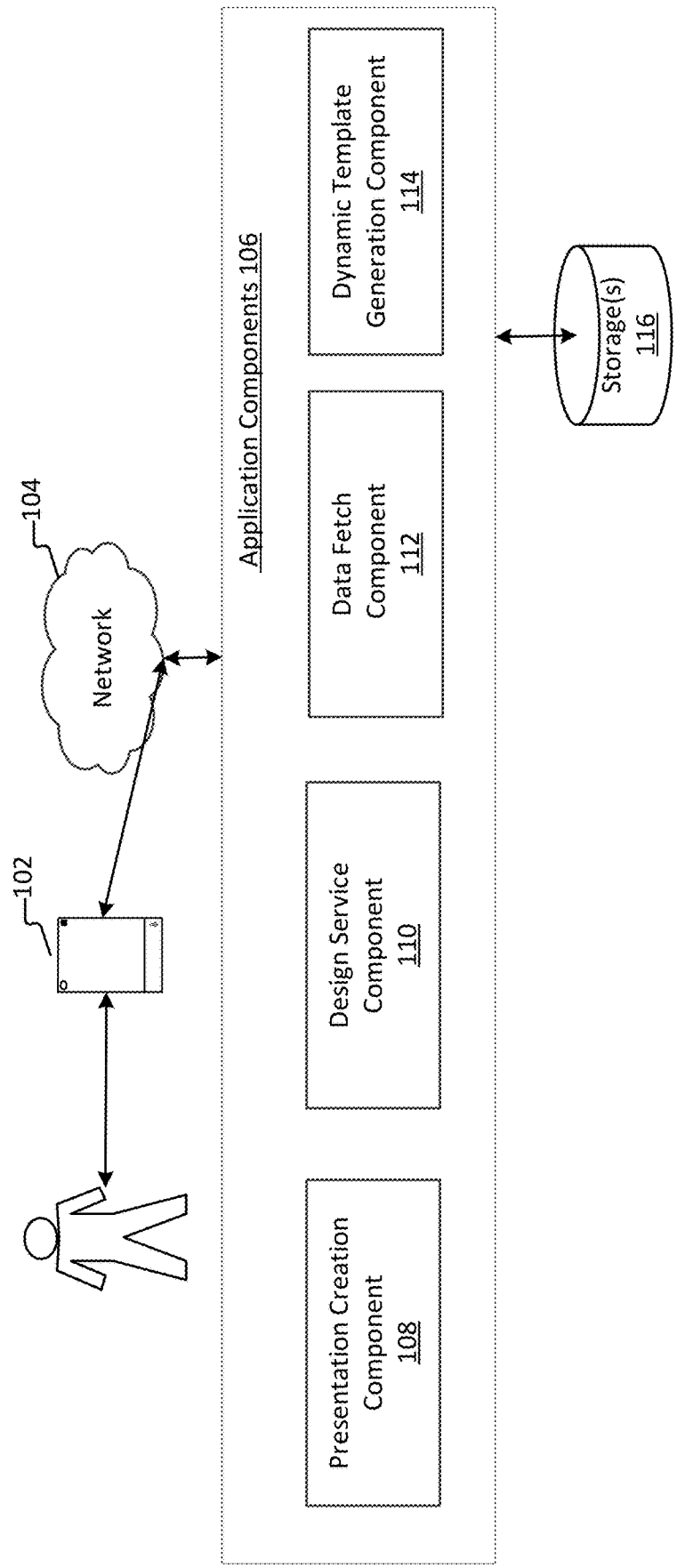
FIG. 1 illustrates an exemplary system implementable on one or more computing devices on which aspects of the present disclosure may be practiced.

Non-limiting examples of the present disclosure describe dynamic content generation where an electronic document of an application/service may be dynamically generated in a manner that is tailored specifically for a user. As an example, a dynamically generated electronic document may be a customized template of slide content presented through a visual presentation program. Dynamic content generation is an intent-based objective seeking to discern what a user is seeking to achieve and help the user complete a task. As an example, processing operations described herein identify appropriate content to include within an electronic document as well as determine how to arrange/present the content on behalf of the user. For instance, some content may be more appropriate than other content for inclusion within a work-related visual presentation where other types of content may be fine to include in a personal slideshow presentation. An exemplary electronic document comprises a collection of retrieved content that is presented for a user in a customized way. For example, dynamic generation processing operations may, in real-time, customize: a theme of the electronic document, selection of content for inclusion in the electronic document and a layout of the selected content. A query provided by a user that specifies a topic as well as signal data associated with a user (e.g. prior application usage by a user, user profile information, device signal data, etc.) may be evaluated to best determine what to include in an exemplary electronic document (e.g. visual presentation template) and how to optimally arrange content for the user.

The result of a dynamically generated electronic document may require minimal modification on the part of a user to reach a rich, professional and presentable presentation. Among other benefits, user interaction with an exemplary visual presentation service is improved where a user is not required to understand the complexities of an application/service to generate a quality presentation. Further, since the electronic documents are dynamic, consideration may be given to signal data associated with the user when generating a presentation. This enables components used for electronic document generation to customize a generated result to best match a determined intent of the user while accounting for: user preferences, past application usage by the user, user interface selections and/or disambiguation of content, among other examples. For instance, the kind of presentations a user has created or used in the past can be contemplated when determining the layout, theme and content for an exemplary electronic document. An exemplary visual presentation service also makes use of the other resources (e.g. applications/services associated with a particular platform or third-party applications/services) that can be utilized to extend functionality of the exemplary visual presentation service when dynamically generating an electronic document. For instance, additional resources can interface with an exemplary visual presentation service to enable, among other services: query processing, content retrieval, generation of slide content suggestions, deterministic and/or probabilistic modeling as well as telemetry data collection and analysis.

Further, in some examples, updates to signal data associated with a user may result in updates to or recommendations for an exemplary electronic document. User preferences may change over time. Updates to signal data associated with a user may result in either: 1) a contextual suggestion/recommendation for updating a created electronic document; and/or 2) automated dynamic update to the electronic document, for example, where a new version of the electronic document is created for a user.

Moreover, an exemplary visual presentation service may be configured to provide user interface functionality that enables a user to access user interface features for the creation and management of dynamic electronic documents. For instance, user interface features may be provided enabling a user to generate a dynamic electronic document when creating a new file in a visual presentation application/service. When a user selects a dynamic template, the visual presentation service is configured to prompt the user to enter a topic (or topics) for a presentation. Based on the topic submitted by user, content is retrieved for a user (e.g. in real-time) and is used in dynamic creation of an electronic document (e.g. presentation template) by one or more components of the visual presentation service. An exemplary electronic document contains content related to the topic along with theme and layout based on the kind and amount of information fetched from the various data service providers. For example, if user selects a topic related to a person or famous personality, the visual presentation service is configured to dynamically create a presentation that may contain data and images associated with the person/famous personality. The visual presentation service is configured to be adapt content, theme and layout of an exemplary electronic document based on not only the topic but also the type of presentation being created. For instance, if the topic is related to an organization or company, dynamic generation of a dynamic electronic document which will contain along with pictures and data, charts of financial results, competitor analysis of the company, stock progress, insertion of content from organization presentations etc. In this way, users automatically receive relevant data in a presentation along with the suggestions/recommendations which are important for the presentation e.g. charts, information on organizational members, etc. for an organizational presentation.

Accordingly, the present disclosure provides a plurality of technical advantages including but not limited to: enabling dynamic content generation functionality to be incorporated into applications/services, providing of an enhanced user interface that comprises user interface features to enable dynamic content generation, more efficient operation of processing devices (e.g., saving computing cycles/computing resources) through stream-lining processing for automated electronic document generation processing, ability to dynamically customize electronic documents in a manner where content can be specifically tailored for a user/group of users, improving user interaction with applications/services and extensibility to integrate processing operations described herein in a variety of different applications/services, among other examples.

FIG. 1 illustrates an exemplary system 100 implementable on one or more computing devices on which aspects of the present disclosure may be practiced. System 100 may be an exemplary system for dynamic generation of an electronic document by an exemplary application/service. Components of system 100 may be hardware components or software implemented on and/or executed by hardware components. In examples, system 100 may include any of hardware components (e.g., ASIC, other devices used to execute/run an OS, and software components (e.g., applications, application programming interfaces, modules, virtual machines, runtime libraries) running on hardware. In one example, an exemplary system 100 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 4-6. One or more components of system 100 may be configured to execute any of the processing operations described in at least method 200 described in the description of FIG. 2. In other examples, the components of systems disclosed herein may be spread across multiple devices. Exemplary system 100 comprises application components 106 that further comprise: a presentation creation component 108, a design service component 110, a data fetch component 112 and a dynamic template generation component 610, as described herein.

One or more data stores/storages or other memory may be associated with system 100. For example, a component of system 100 may have one or more data storage(s) 116 (described below) associated therewith. Data associated with a component of system 100 may be stored thereon as well as processing operations/instructions executed by a component of system 100. Furthermore, it is presented that application components of system 100 may interface with other application services. Application services may be provided as platform resources referenced in the foregoing. Application services may be any resource that may extend functionality of one or more components of system 100.

Application services may include but are not limited to: personal intelligent assistant services, productivity applications, web search services, e-mail applications, calendars, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 100.

System 100 may comprise one or more storage(s) 116 that may store data associated with operation of one or more components of system 100. In examples, storage(s) 116 may interface with other components of system 100. Data associated with any component of system 100 may be stored in storage(s) 116, where components may be connected to storage(s) 116 over a distributed network including cloud computing platforms and infrastructure services. Exemplary storage(s) 116 may be any of a first-party source, a second-party source, and a third-party source. Storage(s) 116 are any physical or virtual memory space. Storage(s) 116 may store any data for processing operations performed by components of system 100, retained data from processing operations, stored programs, code or application programming interfaces (APIs), training data, links to resources internal and external to system 100 and knowledge data among other examples. Furthermore, in examples, components of system 100 may utilize knowledge data in processing by components of system 100. Knowledge may be used by one or more components of system 100 to improve processing of any of the application components 106 where knowledge data can be obtained from resources internal or external to system 100. In examples, knowledge data may be maintained in storage(s) 116 or retrieved from one or more resources external to system 100 by knowledge fetch operation.

In FIG. 1, processing device 102 may be any device comprising at least one processor and at least one memory/storage. Examples of processing device 102 may include but are not limited to: processing devices such as desktop computers, servers, phones, tablets, phablets, slates, laptops, watches, and any other collection of electrical components such as devices having one or more processors or circuits. In one example processing device 102 may be a device of a user that is executing applications/services. In examples, processing device 102 may communicate with the application components 106 via a network 104. In one aspect, network 104 is a distributed computing network, such as the Internet. Application components 106 may also communicate with application services via the network 104. Processing device 102 may be a device as described in the description of FIGS. 4-6. In some examples, processing device 102 may comprise multiple connected devices. Processing device 102 is an example of a user computing device.

The processing device 102 may execute processing operations that include an ability to access an application/service through a user account. In one example, processing device 102 may connect an authenticated user to an exemplary application/service that stores user data for one or more users of the application/service. An exemplary storage application/service may provide a user of processing device 102 with access to data stored in an exemplary data center. In one example, processing device 102 may be connected with storage(s) 116 via a distributed network, which may provide users with access to user data. One or more tenant resources (e.g. Tenant Resource A, Tenant Resource B, Tenant Resource C, etc.) may be associated with processing device 102. A tenant resource may be a user account associated with a processing device and/or distributed network service. Data associated with a tenant resource may be stored on storage(s) 116, where a tenant account can be utilized to access stored data by processing device 102 and/or other processing devices. Application components 106 are components configured to execute processing operations to enable dynamic template generation within an exemplary application/service that is executing on client computing device 102. The application components 106 are executed by one or more computing devices. An exemplary computing device may comprise one or more processors and memory, among other components. Examples of computing devices are provided in the description of at least FIGS. 4-6. The application components 106 comprise: a presentation creation component 108, a design service component 110, a data fetch component 112 and a dynamic template generation component 114. While examples described herein may reference an exemplary visual presentation service that generates a slide-based presentation, it should be recognized that application components 106 can be configured to generate a dynamic electronic documents for any type of application/service including but not limited to: word processing services, spreadsheet services, messaging/email services, presentation services, information gathering and collaborative services and diagramming services, among other examples.

The presentation creation component 108 is configured to manage other components of the application components 106 for dynamic generation of an exemplary electronic document as described herein. In one instance, the presentation creation component 108 communications an exemplary slide-based visual presentation to client computing device 602. For instance, the present creation component 108 is configured for: collection of data needed to generate a slide-based visual presentation, finalization of the slide-based visual presentation, communication of a finalized slide-based visual presentation to the client computing device 602 as well as management any updates to a slide-based visual presentation. In doing so, the presentation creation component interfaces with the design service component 110, the data fetch component 112 and the dynamic template generation component 114, for generation of an exemplary slide-based visual presentation.

An exemplary visual presentation service (executing on client computing device 602) is configured to enable a user to have the option to select a user interface (UI) feature for dynamic creation of a slide-based visual presentation. When the user selects the UI feature for dynamic template generation of a slide-based visual presentation, the visual presentation service is configured to provide UI features that enable a user to enter a query that specifies a topic for creation of an electronic document for a presentation. The UI features are also configured to enable a user to enter additional data that may be useful in creating an exemplary visual presentation. For instance, UI may provide additional fields to enter information including but not limited to: sub-topics, keywords and selection of generated slide content suggestions, among other examples.

In one example, the presentation creation component 108 may interface with one or more of the other application components 106 to enable processing of the query including an evaluation of the topic. For instance, language understanding processing may be applied to provide semantic and contextual understanding for a topic entered by a user. In doing so, knowledge resources including knowledge repositories may be applied for processing including but not limited to: semantic understanding including word and/or meaning identification, entity evaluation, slot tagging and part of speech processing (POS). In one example, query processing is executed by components associated with the visual presentation service. In another example, the query is transmitted to another resource (e.g. data service provider) for query processing, where query processing results are returned to the visual presentation service for subsequent processing. For instance, platform resources may comprise, among other resource: a visual presentation service, a search service, a language understanding processing service, knowledge resources, etc., which can be collectively used to extend processing by the visual presentation service as well as enhance processing efficiency and an overall user experience.

In any example, the visual presentation service may utilize results of query processing to generate exemplary slide content suggestions as selectable UI features that can be presented to a user through the UI of the visual presentation service. Exemplary slide content suggestions options can be generated based on one or more of: query processing, content retrieved (e.g. from exemplary data service providers) based on a topic of the query and signal data associated with a user, for example, that initiated the query. Slide content suggestions can be presented to a user through the UI of the visual presentation service, where a user can select one or more slide suggestion options indicating specific sub-topics that the user wishes to have included in a dynamically generated electronic document. That is, slide content suggestions may comprise sub-topics for a topic (of the query), which are identified based on query processing. An example of a user interface view 320 (FIG. 3B) illustrates one example of a presentation of exemplary slide content suggestions. Evaluation of selected slide suggestion options may be executed by the dynamic template generation component 114, for example, when interfacing with the data fetch component 112 to retrieve content or refine retrieved content. Further, evaluation of the selected slide content suggestions may occur by the dynamic template generation component 114 when dynamically generating an exemplary electronic document.

Furthermore, a query received through the visual presentation service may be associated with a user profile. A user may sign-in directly through a UI feature of the visual presentation service or may be already recognized when the user signs in to a device or platform account (e.g. group software services and subscriptions) that comprises the visual presentation service. The topic, additional data provided by the user and signal data associated with the user are passed to the presentation creation component 108. The presentation creation component 108 then interfaces with the dynamic template generation component 114, which is configured to manage creation of a template for an exemplary slide-based visual presentation. The dynamic template generation component 114 passes the query (e.g. topic and additional data including selection of slide content suggestions) to data fetch component 112.

The data fetch component 112 is configured to interface with a plurality of data service providers to manage access to a plurality of resources associated with the data service providers. Data service providers enable the data fetch component to connect with and access a plurality of data resources via a distributed network. Exemplary data service providers comprise any of first-party application/services, second-party applications/services and third-party applications/services. For instance, exemplary data service providers comprise: search engine services, intelligent personal assistant services, social networking services, knowledge repositories/databases, distributed networking/storage services, informational services (e.g. online encyclopedia), language understanding services, handwritten input understanding services, audio input understanding services, image processing recognition services and optical character recognition services, among other examples. The data fetch component 112 receives transmission of the query/topic/additional data (e.g. selection of slide content suggestions) from the dynamic template generation component 114 and accesses resources of the data service providers to retrieve content. Any type of content may be retrieved by the data fetch component 112 including but not limited to: files/documents, images, audio, rich media objects, links/hyperlinks, search results and social media content, among other examples. Further, in some examples, the presentation creation component 108 may communicate with the data fetch component 112 to retrieve data for generation of exemplary slide content suggestions. For instance, a first pass of content may be retrieved based on the query processing, where the retrieved content may be refined (e.g. re-searched/filtered) based on selection of slide content suggestions by a user.

The data fetch component 112 utilizes the query data provided with the query and other signal data to dynamically create an electronic document for slide-based visual presentation. Content retrieved from exemplary data service providers is returned to the data fetch component 112 where the data fetch component 112 transmits the retrieved content to the dynamic template generation component 114. In examples, the data fetch component 112 may also provide additional contextual signal data resulting from processing of query data including signal data provided by specific resources associated with data providers.

In one example, the dynamic template generation component 114 may utilize the processing of the query, the retrieved content (and any additional contextual signal data) to dynamically create an electronic document for a slide-based visual presentation. In further examples, the dynamic template generation component 114 further utilizes collected signal data associate with a user to dynamically generate the electronic document for a slide-based visual presentation. Collected signal data may comprise but is not limited to: contextual signal data resulting from query processing (e.g. provided by the data fetch component), user signal data collected by the presentation creation component, application/service usage data (e.g. of the visual presentation service) and any other signal data collected such as device specific signal data, among other examples. In some examples, signal data associated with a user may be collected, aggregated and analyzed. For example, signal data associated with the user can be aggregated and analyzed at the application level (e.g. usage of visual presentation service by user), at a distributed service level (e.g. usage of a plurality of applications across a platform) and a user-specific level (e.g. user profile data, preferences, etc.), among other examples. Processing operations for telemetric analysis may be executed to assist one or more trained models in processing of user signal data to tailor an exemplary template for a user. Further, in some examples, exemplary templates are configured to be dynamically updated as user signal data changes. Developers and/or users may be able to control settings related to dynamic update of templates, electronic documents, etc.

Dynamic generation of an electronic document comprises utilizing the query and signal data to determine: a theme for the presentation, content to include within the presentation and a layout of the slides/content for the slide-based visual presentation. A template for a slide-based visual presentation may be dynamically generated based on processing of the query and data provided by the user. For example, a user may specify, through UI input, one or more topics/sub-topics for the theme of a slide-based visual presentation. A user interface of a visual presentation program may be configured to enable users to provide additional data that can be used to dynamically generate an electronic document for a slide-based presentation. Examples of additional information a user may be prompted to enter may comprise but is not limited to: selection of slide content suggestions (e.g. generated based on evaluation of the topic and/or retrieved content), information indicating what a presentation is being created for (e.g. educational purposes, business purposes, party/occasion, etc.), intended audience, additional terms/descriptors, content preferences (e.g. type, style, whether to include rich media content, etc.), style preferences, slide-design preferences, etc., to assist in dynamic generation of an electronic document for a slide-based visual presentation. In some examples, information (including additional information) may be entered through selection of UI features provided through a user interface of an exemplary visual presentation program.

As identified above, the theme may be determined based on processing of user query data that may comprise explicit indication of a theme, topic, sub-topic. In some examples, a theme may be determined based on processing operations that apply a trained model to evaluate a query that comprises a specified topic and/or sub-topic. An exemplary trained model may apply processing operations that may apply language understanding processing, recognition processing, speech to text conversion, word similarity, part of speech (POS) tagging, entity evaluation, semantic understanding and intent determination. As such, a trained model may be configured to generate deterministic and/or predictive determinations regarding an intent of a user. In further examples, an exemplary trained model to evaluate additional information to determine a theme for a visual presentation. Additional information used for determination of an exemplary theme may comprise but is not limited to: selection of slide content suggestions, evaluation of content retrieved from a data fetch component, additional data provided in a query received through a UI of an exemplary visual presentation service, user profile data, user signal data and application usage signal data, among other examples. Any combination of an evaluation of the query, retrieved content and an evaluation exemplary additional data may be evaluated to specifically tailor a theme of a visual presentation in a user or context specific manner. A ranker may be applied to rank and evaluate the different attributes (individually or collectively) to determine a theme of an exemplary template. Examples of rankers and associated processing are known to one skilled in the art.

The dynamic template generation component 114 may further evaluate content retrieved by the data fetch component 112 for inclusion within an electronic document of a slide-based visual presentation. In addition to evaluating retrieved content for a purpose of determining a theme for a visual presentation, the dynamic template generation component 114 may execute processing operations to evaluate content for inclusion within an electronic document for a slide-based visual presentation. As an example, the dynamic template generation component 114 may execute processing operations that apply one or more trained models to evaluate whether specific content is: relevant and/or appropriate for inclusion within a slide-based visual presentation as well as evaluate the specific content in view of a type of presentation that is being created (e.g. slide-based presentation versus word document, intended audience, size of presentation, etc.). As such, a trained model may be configured to execute deterministic and/or predictive determinations regarding whether specific content is to be included in a dynamically generated electronic document. Factors that are used to evaluate the content for relevance and/or appropriateness for inclusion within a slide based presentation may comprise but are not limited to: type of template being created, relationship to identified theme (e.g. topic/sub-topic), evaluation of additional data provided by a user or disambiguated by a user, evaluation of signal data associated with a user, evaluation of application/service usage, type of content, context of content, size, form-factor, intended audience, and application of filters to identity inappropriate content (e.g. obscene, vulgar, racist, sexual), among other examples. Factors that are used to evaluate specific content in view of a type of presentation that is being created may comprise but are not limited to: the above identified factors for evaluating relevance/appropriateness, the type of template being created (e.g. template for slide-based visual presentation, word document, spreadsheet document, note, social networking object, etc.) and size of template (e.g. number of slides in a slide-based presentation, among other examples. In some examples, content included within an exemplary electronic document may be generated based on analysis of retrieved content. For instance, suggestions/recommendations, UI indications, cues, etc. may be included within an electronic document and emphasized for a user. A ranker may be applied to rank and evaluate the different attributes (individually or collectively) to determine content to include within an exemplary template. Examples of rankers and associated processing are known to one skilled in the art.

The dynamic template generation component 114 may further determine how to layout and organize content within a dynamically generated electronic document. In doing so, the dynamic template generation component 114 may apply a trained model to evaluate different attributes including but not limited to: type of template being created, number of slides/pages, etc., positioning/placement/alignment of content, formatting of content, sizing of specific content, evaluation of spatial aspects of portion of a template (e.g. slides where evaluation may consider an amount of content to include per slide in view of size of specific content), sections of content to include, whether to include a title page and/or table of contents or other specific type of slide and how to emphasize the content (e.g. cue, recommendation, UI indication, formatting, etc.), among other examples. Such attributes may be evaluated by the trained model to make determinations as to the layout and organize the template. For example, a model may evaluate different attributes for a layout of a template or electronic document based on: results of query processing, selection of slide content suggestions, specific retrieved content and/or evaluation of signal data associated with a user. In some cases, the trained model may execute a weighted evaluation that makes determinations as to how to formerly layout and organize the template based on one or more of the above identified attributes. Weighted evaluations may also be applicable in determining the theme and specific content to include within a dynamically generated electronic document. A ranker may be applied to rank and evaluate the different attributes (individually or collectively) to determine a layout and organization of an exemplary electronic document. Examples of rankers and associated processing are known to one skilled in the art.

The design service component 110 interfaces with other components of an exemplary visual presentation program/service to provide visual enhancement for an exemplary visual presentation (e.g. slide-based visual presentation). Once an exemplary template is dynamically generated, a template for the electronic document is transmitted from the dynamic template generation component 114 to the presentation creation component 108. The presentation creation component 108 is configured to interface with the design service component 110, which is configured to further update the template for presentation to one or more users once the template is received from the presentation creation component 108. For instance, the design service component 110 is configured to: match a theme/content layout to produce a visual representation of the template as well as add visual enhancement, cues, slide transitions, UI interface aspects, etc. to enhance/beautify an exemplary template. Processing operations related to adding design elements to enhance/beautify an exemplary template are known to one skilled in the art.

Upon completion of design processing by the design service component 110, an exemplary template is transmitted back to the presentation creation component 108. The template may be finalized by the presentation creation component 108 and provided to a client processing device (e.g. processing device 102), where an exemplary electronic document may be presented through the UI of the visual presentation service. Subsequent update to an exemplary electronic document including dynamic updates may be similarly managed by application components 106.

FIG. 2 is an exemplary method 200 related to dynamic generation of an electronic document with which aspects of the present disclosure may be practiced. As an example, method 200 may be executed by an exemplary processing device and/or system such as those shown in FIGS. 4-6. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. Processing operations described in method 200 may be implemented by one or more components connected over a distributed network, for example, as described in system 100 (of FIG. 1).

Method 200 begins at processing operation 202, where an exemplary query is received. As an example, a query may be received through a user interface of a visual presentation service. In examples, the query may comprise a topic for generation of a slide-based visual presentation. One example related to receipt of a query through an exemplary visual presentation service is illustrated in user interface view 300 (FIG. 3A) subsequently described.

Flow may proceed to processing operation 204, where a received query is processed. Examples relating to processing of an exemplary query have been described in the foregoing description of FIG. 1. As previously described, query processing may occur by a component of an exemplary visual presentation service or a component associated with an exemplary data service provider that interfaces with the visual presentation service.

In some examples, flow of method 200 may proceed to processing operation 206, where slide content suggestions are generated. Generation of slide content suggestions have been described in the foregoing description of FIG. 1. As an example, slide content suggestions may be generated based on processing (operation 204) of a received query. For instance, slide content suggestions may comprise slide options that comprise sub-topics for the topic that are identified based on a processing of the query. In some instances, an exemplary visual presentation service may communicate with data service providers to identify content that may be utilized to generate slide content suggestions.

In examples where slide content suggestions are generated, flow may proceed to processing operation 208, where the slide content suggestions are presented. As an example, slide content suggestions may be presented to a user through a user interface of an exemplary visual presentation service. One example related to presentation of exemplary slide content suggestions is illustrated in user interface view 320 (FIG. 3B) subsequently described.

Flow may proceed to decision operation 210, where it is determined whether a selection of one or more slide content suggestions is received. As referenced above, alternate examples of method 200 may omit generation and presentation of slide content suggestions. In such examples, flow may branch NO and proceed to processing operation 214. In other examples where slide content suggestions are presented, processing may wait for a response from a user where the response may comprise selection of one or more slide content suggestions. In examples where slide content suggestions are presented to a user, flow of method 200 branches YES (at decision operation 210) when a selection is received. Flow proceeds to processing operation 210, where the selection of one or more slide content suggestions is received. As an example, selection of one or more slide content suggestions may be received through a user interface of an exemplary visual presentation service.

At processing operation 214, content may be retrieved from one or more of a plurality of data service providers for dynamic generation of an electronic document for a user. Exemplary data service providers and retrieval of content therefrom has been described in the foregoing description of FIG. 1. In one example, content is retrieved by a plurality of data service providers that are connected with the visual presentation service via a distributed network.

Flow may proceed to processing operation 216, where an exemplary electronic document is dynamically generated. A dynamic electronic document is a result of finalizing a template for presentation to a user through an application/service. Dynamic generation of an exemplary electronic document has been further described in the foregoing description (e.g. refer to description of FIG. 1). In one example, the generating (processing operation 216) dynamically tailors a template for a user based on the processing of the query, the retrieved content and an evaluation of signal data associated with the user. Signal data associated with a user has been described in at least the foregoing description of FIG. 1. In examples, signal data associated with the user may comprise one or more of: signal data collected by the visual presentation service pertaining to usage of the visual presentation service by the user, signal data pertaining to usage across a plurality of applications that are associated with a user account of the user and signal data collected from a profile of a user, among other examples.

In further examples, processing operation 216 takes into account additional signal data including selection of exemplary content slide suggestions in the generation an exemplary electronic document. Processing operation 216 comprises determination of: a theme for the template, specific content to include within the template and determining a layout and/or organization for the specific content in a final representation of an electronic document. That is, an exemplary electronic document is automatically generated for a user (or group of users) where the electronic document may be specifically tailored to the user by theme, content and layout. In further examples, dynamic generation (processing operation 216) of the electronic document further comprises executing operations described to enhance/beautify a template as described with respect to the design service component 110 of FIG. 1.

Once a template is dynamically generated, flow may proceed to processing operation 218, where the dynamically generated template is presented as an electronic document for a user. As an example, the dynamically generated electronic document may be a template for a slide-based visual presentation. In such an example, the dynamically generated electronic document may be presented (processing operation 218) through the user interface of the visual presentation service. In one example, the dynamically generate electronic document may be generated by a service and transmitted to a client processing device (e.g. processing device 102 of FIG. 1) for presentation.

Flow may proceed to decision operation 220, where it is determined whether the electronic document is to be re-generated. As described above, an exemplary electronic document may be dynamic and capable of update based on changes to signal data associated with a user. That is, signal data of the user may be continuously evaluated with an aim of improving user interaction and processing efficiency for a user of an exemplary visual presentation service. In some examples, update to signal data associated with a user may trigger suggestions for update to a generated electronic document. For instance, a suggestion for an update to the electronic document may be provided through a user interface of the visual presentation service. In another example, an updated version of the electronic document by generated based on an updated evaluation of signal data associated with a user. In such an example, flow may branch YES and processing returns to processing operation 216, where the template is dynamically re-generated. In an alternate example, a user may provide an updated query to trigger re-generation of an exemplary template. In such an example, flow branches YES and processing returns to processing operation 202, where an updated query is received. In examples where decision operation 220 determines that no update is to be made to the template, flow branches NO and processing remains idle until an additional request is received.

Figure 3A:
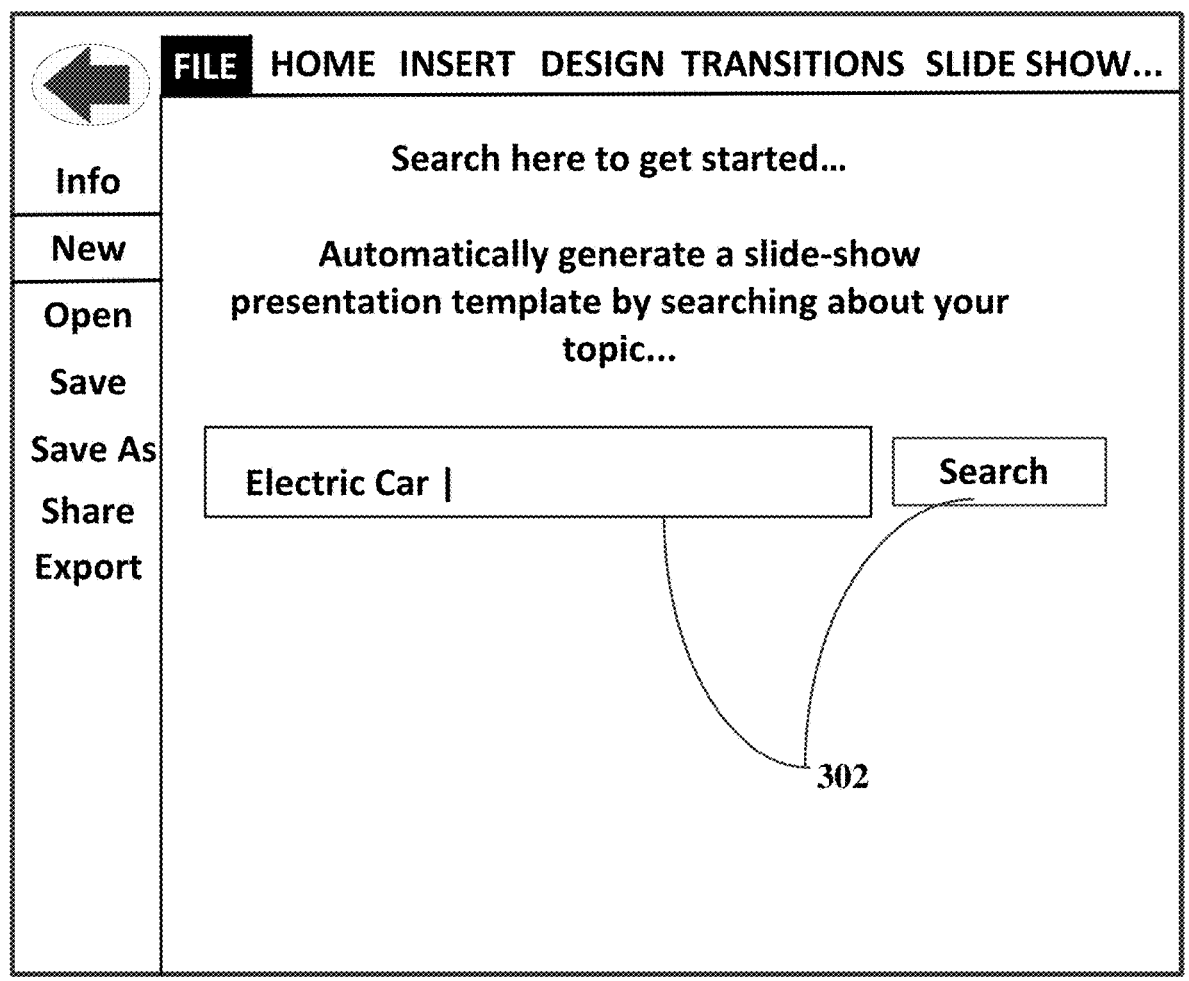
FIGS. 3A-3C provide user interface views illustrating an exemplary visual presentation program with which aspects of the present disclosure may be practiced.
Figure 3B:
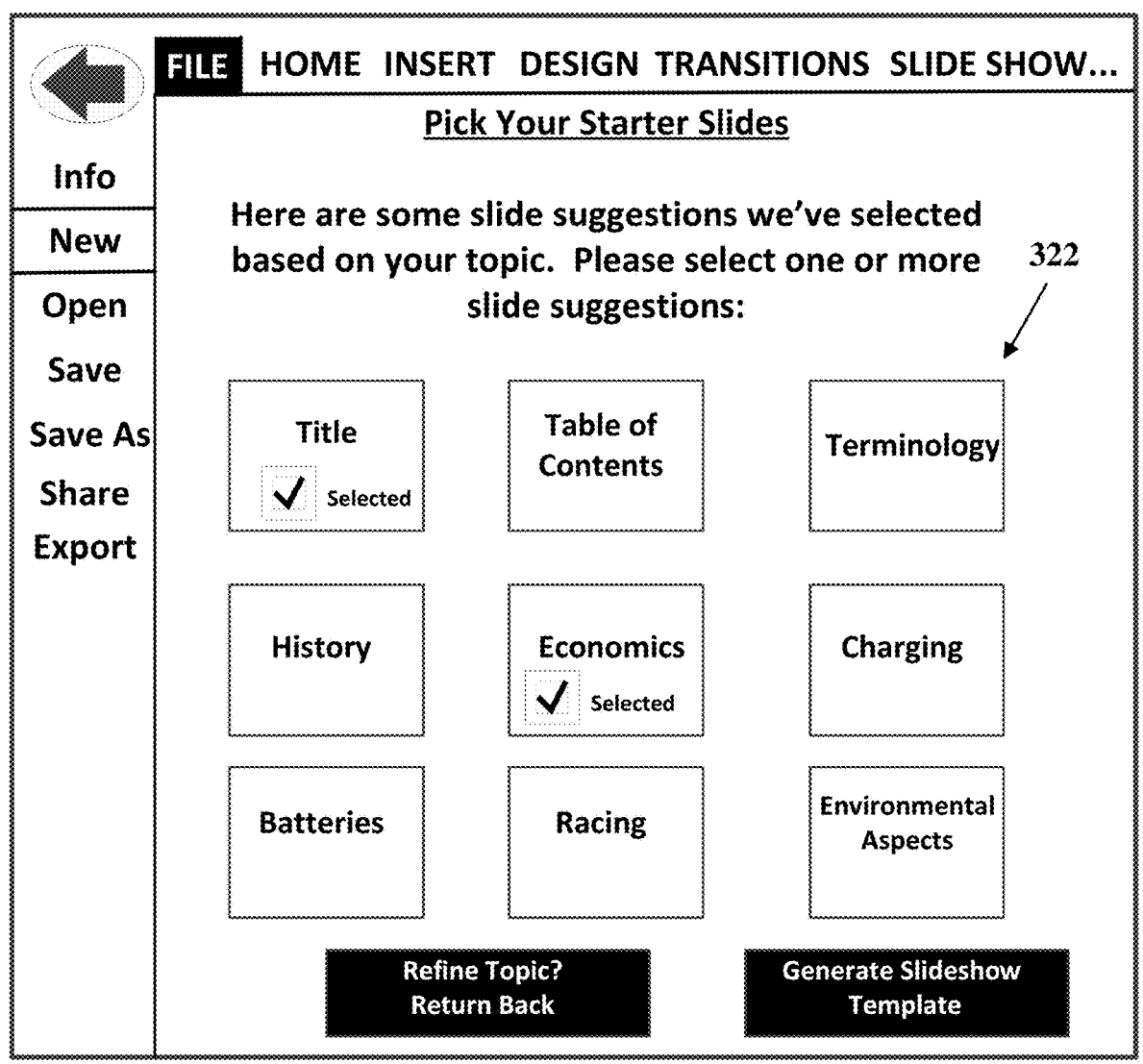
Figure 3C:
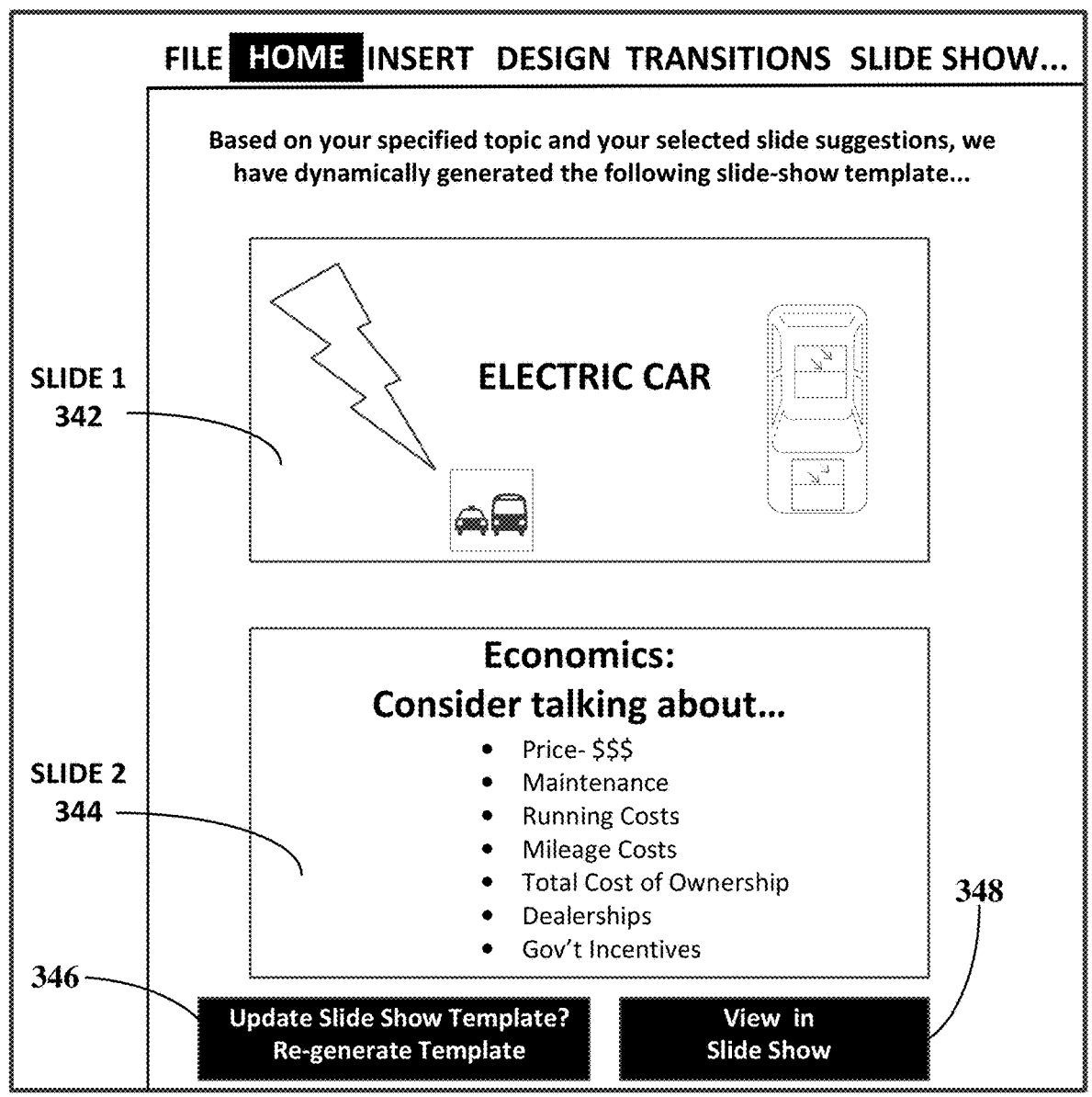

FIGS. 3A-3C provide user interface views illustrating an exemplary visual presentation program with which aspects of the present disclosure may be practiced.

User interface view 300 (FIG. 3A) is an illustration of an exemplary visual presentation service that presents UI features 302 for query processing. UI features 302 are configured to enable a user to provide a topic that can be utilized to dynamically generate an exemplary electronic document. UI features 302 comprise a first UI feature field for entry of a topic and a second UI feature field to enable searching of the entered topic. In the example shown, a user enters a topic of "Electric Car" into a UI field of the user interface. The entered query may be processed as described in the foregoing. In one example, a result of the query processing is illustrated in user interface view 320 (FIG. 3B).

User interface view 320 (FIG. 3B) is an illustration of an exemplary visual presentation service that presents UI features 322 for selection of exemplary slide content suggestions. Slide content suggestions have been described in the foregoing description. UI features 322 are configured to enable to select specific content to include within a dynamically generated electronic document. As shown in user interface view 320, a user has selected 2 content slide suggestions (e.g. for a Title slide and a suggestion relate to economic aspects of electric cars). A template that is dynamically generated for the user may comprise slides based at least on the user selection of the content slide suggestions. User interface view 340 (FIG. 3C) illustrates an exemplary electronic document generated based on at least the content slide suggestions elected in FIG. 3B.

User interface view 340 (FIG. 3C) is an illustration of an exemplary visual presentation service that presents UI features 342 and 344 corresponding to dynamically generated slides for a slide-based presentation. UI feature 342 (slide 1) is an exemplary slide that is dynamically generated based on at least the topic (electric car) and a selection of a first slide content suggestion (title). UI feature 344 (slide 2) is an exemplary slide that is dynamically generated based on at least the topic (electric car), a selection of a second slide content suggestion (economics) and query processing. Examples described herein are not limited to generating slides in a 1-to-1 relationship for selected content slide suggestions. In other examples, multiple slides may be generated based on a selection of a single content slide suggestion. Generation of slides within a slide-based visual presentation may vary based on the evaluation executed by an exemplary dynamic template generation component such as dynamic template generation component 114 (of FIG. 1). As described above, theme, content and layout may vary based on any number of factors previously described including signal data associated with a user. For example, analysis of user signal data may identify that a user works for a specific electric car manufacturer such as TESLA®. In such an example, content may be tailored to emphasize aspects a perspective on car analysis based from the gathered user signal data (e.g. past usage and analysis) as well as data collected regarding economic information and guidance relating to a company such as TESLA®. Additional UI features 346 and 348 may be provided in the UI of the visual presentation interface to enable navigational control. For instance, UI feature 346 can be utilized to quickly direct a user back to user interface view 300 (where a user can re-enter a query) or user interface view 320 (where a user can re-select content slide suggestions). UI feature 348 is configured to present generate a slideshow presentation through the visual presentation service for an exemplary dynamically generated electronic document.

Figure 4:
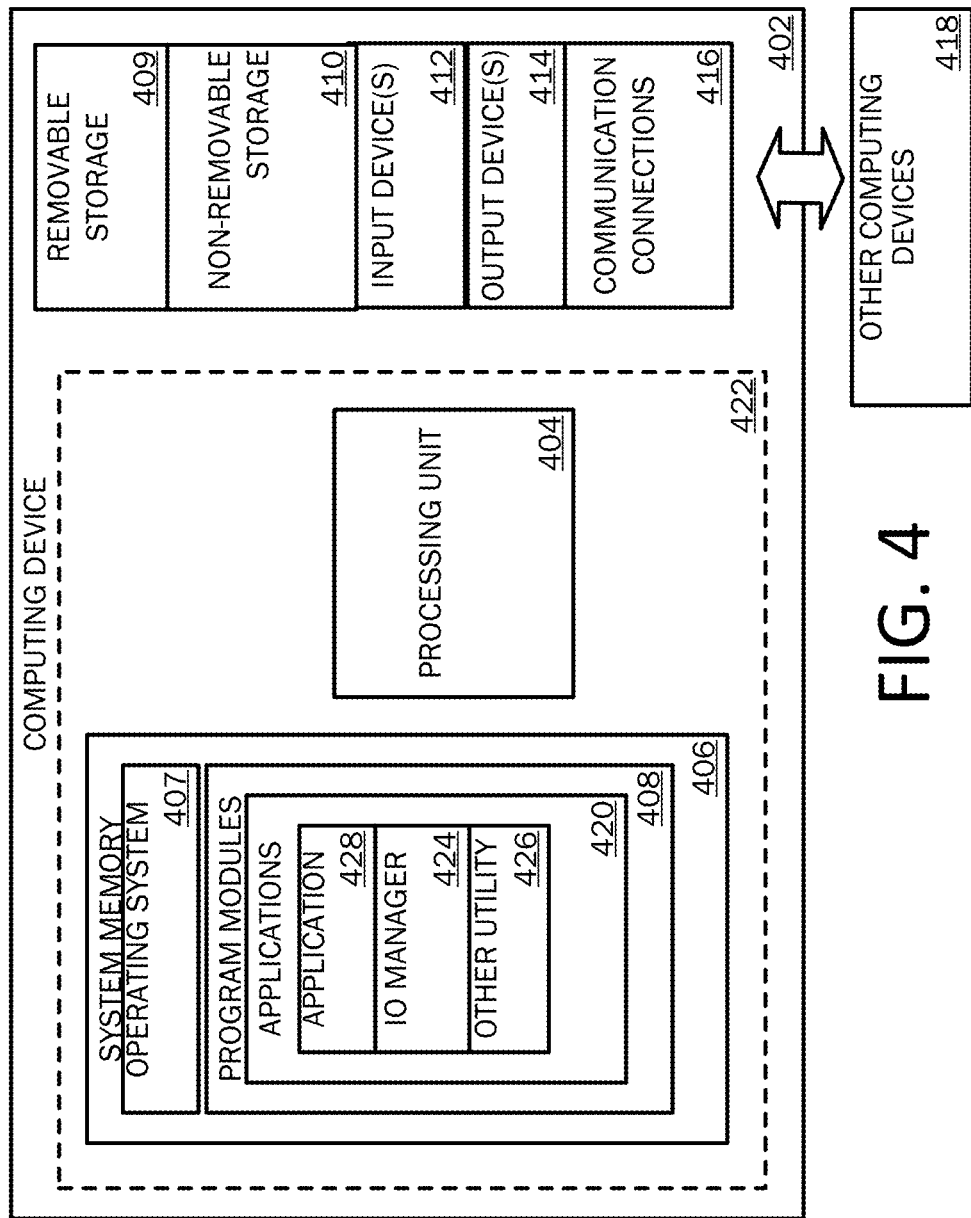
FIG. 4 is a block diagram illustrating an example of a computing device with which aspects of the present disclosure may be practiced.
Figure 5B:
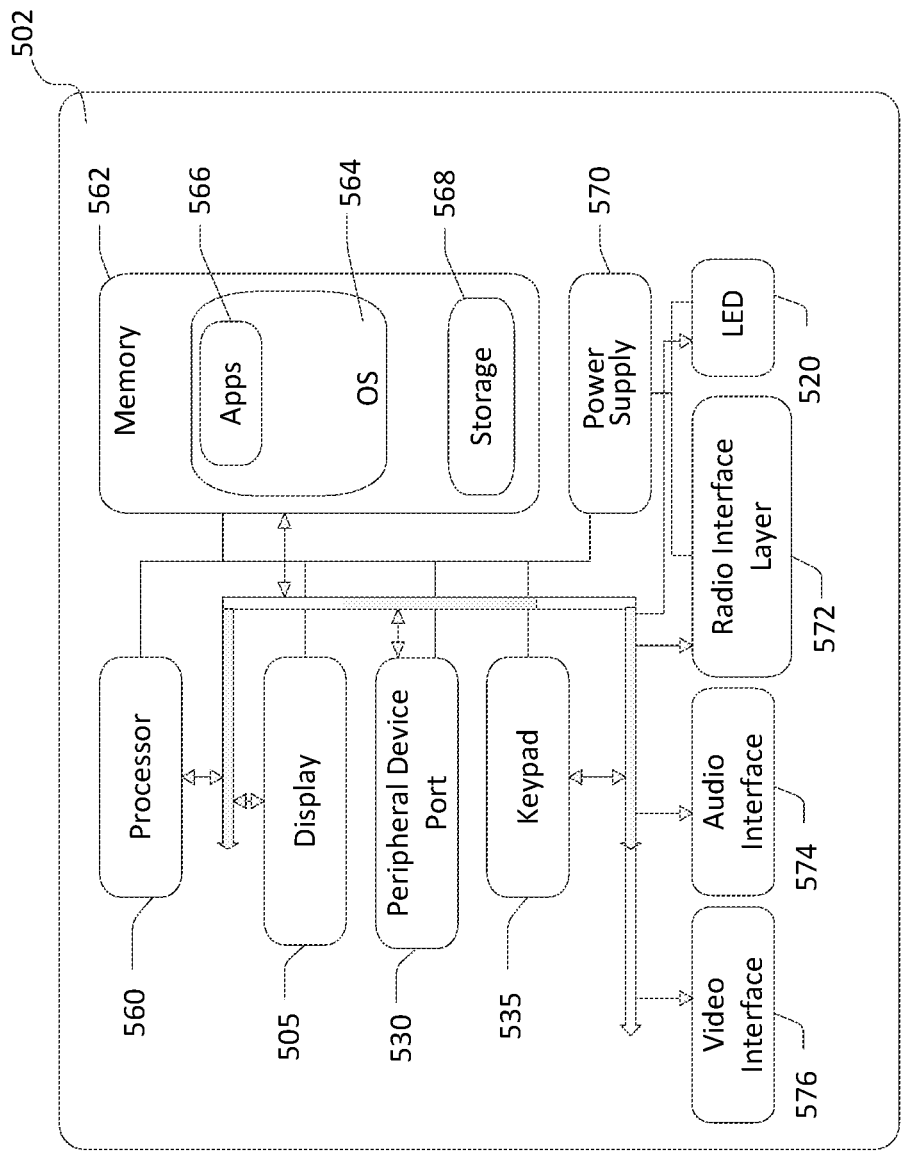
Figure 6:
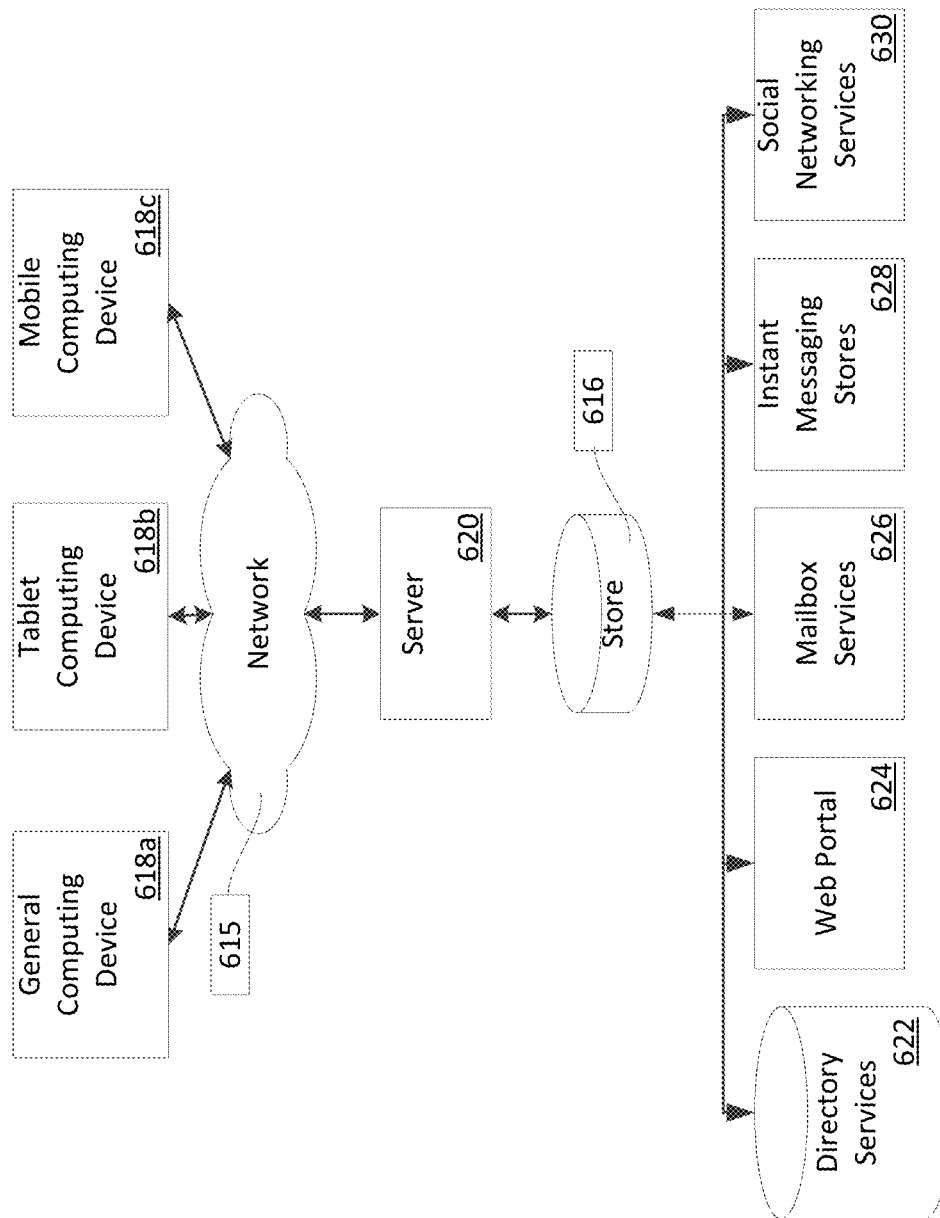
FIG. 6 is a simplified block diagram of a distributed computing system in which aspects of the present disclosure may be practiced.

FIGS. 4-6 and the associated descriptions provide a discussion of a variety of operating environments in which examples of the invention may be practiced. However, the devices and systems illustrated and discussed with respect to FIGS. 4-6 are for purposes of example and illustration and are not limiting of a vast number of computing device configurations that may be utilized for practicing examples of the invention, described herein.

FIG. 4 is a block diagram illustrating physical components of a computing device 402, for example a mobile processing device, with which examples of the present disclosure may be practiced. Among other examples, computing device 402 may be an exemplary computing device configured for dynamic generation of an electronic document by an exemplary application/service. In a basic configuration, the computing device 402 may include at least one processing unit 404 and a system memory 406. Depending on the configuration and type of computing device, the system memory 406 may comprise, but is not limited to, volatile storage (e.g., random access memory), non-volatile storage (e.g., read-only memory), flash memory, or any combination of such memories. The system memory 406 may include an operating system 407 and one or more program modules 408 suitable for running software programs/modules 420 such as IO manager 424, other utility 426 and application 428. As examples, system memory 406 may store instructions for execution. Other examples of system memory 406 may store data associated with applications. The operating system 407, for example, may be suitable for controlling the operation of the computing device 402. Furthermore, examples of the invention may be practiced in conjunction with a graphics library, other operating systems, or any other application program and is not limited to any particular application or system. This basic configuration is illustrated in FIG. 4 by those components within a dashed line 422. The computing device 402 may have additional features or functionality. For example, the computing device 402 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 406. While executing on the processing unit 404, program modules 408 (e.g., Input/Output (I/O) manager 424, other utility 426 and application 428) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 402 may also have one or more input device(s) 412 such as a keyboard, a mouse, a pen, a sound input device, a device for voice input/recognition, a touch input device, etc. The output device(s) 414 such as a display, speakers, a printer, etc. may also be included. The aforementioned devices are examples and others may be used. The computing device 404 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 406, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 402. Any such computer storage media may be part of the computing device 402. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a personal data assistant, a tablet personal computer, a phablet, a slate, a laptop computer, and the like, with which examples of the invention may be practiced. Mobile computing device 500 may be an exemplary computing device configured for dynamic generation of an electronic document by an exemplary application/service. Application command control may be provided for applications executing on a computing device such as mobile computing device 500. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 5A, one example of a mobile computing device 500 for implementing the examples is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In yet another alternative example, the mobile computing device 500 is a portable phone system, such as a cellular phone. The mobile computing device 500 may also include an optional keypad 535. Optional keypad 535 may be a physical keypad or a "soft" keypad generated on the touch screen display or any other soft input panel (SIP). In various examples, the output elements include the display 505 for showing a GUI, a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one examples, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA), tablet and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device (e.g. system 502) described herein.

The system 502 has a power supply 570, which may be implemented as one or more batteries. The power supply 570 might further include an external power source, such as an AC adapter or a powered docking cradle that supplements or recharges the batteries.

The system 502 may include peripheral device port 530 that performs the function of facilitating connectivity between system 502 and one or more peripheral devices. Transmissions to and from the peripheral device port 530 are conducted under control of the operating system (OS) 564. In other words, communications received by the peripheral device port 530 may be disseminated to the application programs 566 via the operating system 564, and vice versa.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525 (as described in the description of mobile computing device 500). In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525 (shown in FIG. 5A), the audio interface 574 may also be coupled to a microphone to receive audible input, such as to facilitate a telephone conversation. In accordance with examples of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing an application that reliably accesses target data on a storage system and handles communication failures to one or more client devices, as described above. The system of FIG. 6 may be an exemplary system configured for dynamic generation of an electronic document by an exemplary application/service. Target data accessed, interacted with, or edited in association with programming modules 408 and/or applications 420 and storage/memory (described in FIG. 4) may be stored in different communication channels or other storage types. For example, various documents may be stored using a directory service 622, a web portal 624, a mailbox service 626, an instant messaging store 628, or a social networking site 630, application 428, IO manager 424, other utility 426, and storage systems may use any of these types of systems or the like for enabling data utilization, as described herein. A server 620 may provide storage system for use by a client operating on general computing device 402 and mobile device(s) 500 through network 615. By way of example, network 615 may comprise the Internet or any other type of local or wide area network, and a client node may be implemented for connecting to network 615. Examples of a client node comprise but are not limited to: a computing device 402 embodied in a personal computer, a tablet computing device, and/or by a mobile computing device 500 (e.g., mobile processing device). As an example, a client node may connect to the network 615 using a wireless network connection (e.g. WiFi connection, Bluetooth, etc.). However, examples described herein may also extend to connecting to network 615 via a hardwire connection. Any of these examples of the client computing device 402 or 500 may obtain content from the store 616.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
providing, through a user interface of a visual presentation service, a user interface feature configured to identify that a slide-based visual presentation is to be created from a topic entered through the user interface feature;
receiving a submission of the topic through the user interface feature configured to identify that a slide-based visual presentation is to be created from a topic;
receiving content associated with a search query for the topic from a plurality of data service providers that are connected with the visual presentation service via a distributed network;
applying a trained model configured to dynamically generate the slide-based visual presentation by executing processing operations that comprise:
determining sub-topics for the topic based on a ranking of relevance of the content that is generated by the trained model during evaluation of the content received from the plurality of data service providers, wherein the trained model generates the ranking of relevance of the content based on an entity evaluation of the content relative to the topic and an evaluation of signal data associated with the user, and
generating a content layout for the slide-based visual presentation based on the ranking of relevance of the content generated by the trained model, wherein the content layout comprises a plurality of slides that are each a sub-topic of the sub-topics determined by the trained model; and
presenting, through the user interface based on the content layout, a template of the slide-based visual presentation that presents the plurality of slides as slide suggestions for the slide-based visual presentation, wherein multiple of the plurality of slides are selectable for inclusion in the slide-based visual presentation.

2. The method of claim 1, wherein the signal data associated with the user comprises signal data pertaining to usage, by a user account associated with the user, across a plurality of applications.

3. The method of claim 1, wherein the signal data associated with the user comprises signal data collected from a profile of a user.

4. The method of claim 1, further comprising: receiving, through the user interface, a selection of two or more of the plurality of slides from the template; and generating the slide-based presentation to include content for the two or more of the plurality of slides based on the receiving of the selection.

5. The method of claim 4, further comprising: receiving, through the user interface, a selection of one of the plurality of slides from the template; and generating the slide-based visual presentation based on the selection of one of the plurality of slides.

6. The method of claim 5, wherein the applying of the trained model further comprises retrieving, from the plurality of data service providers, one or more content portions for a sub-topic associated with the selection of one of the plurality of slides, and wherein the generating of the slide-based visual presentation includes the one or more content portions for the sub-topic.

7. The method of claim 1, wherein the applying of the trained model further comprises retrieving, from the plurality of data service providers, content portions associated with the sub-topics, and selecting, for inclusion in the slide-based visual presentation, one or more of the content based on the ranking of relevance of the content.

8. A system comprising:
at least one processor; and
a memory operatively connected with the at least one processor storing computer-executable instructions that, when executed by the at least one processor, causes the at least one processor to execute a method that comprises:

providing, through a user interface of a visual presentation service, a user interface feature configured to identify that a slide-based visual presentation is to be created from a topic entered through the user interface feature;

receiving a submission of the topic through the user interface feature configured to identify that a slide-based visual presentation is to be created from a topic;

receiving content associated with a search query for the topic from a plurality of data service providers that are connected with the visual presentation service via a distributed network;

applying a trained model configured to dynamically generate the slide-based visual presentation by executing processing operations that comprise:

determining sub-topics for the topic based on a ranking of relevance of the content that is generated by the trained model during evaluation of the content received from the plurality of data service providers, wherein the trained model generates the ranking of relevance of the content based on an entity evaluation of the content relative to the topic and an evaluation of signal data associated with the user, and generating a content layout for the slide-based visual presentation based on the ranking of relevance of the content generated by the trained model, wherein the content layout comprises a plurality of slides that are each a sub-topic of the sub-topics determined by the trained model; and presenting, through the user interface based on the content layout, a template of the slide-based visual presentation that presents the plurality of slides as slide suggestions for the slide-based visual presentation, wherein multiple of the plurality of slides are selectable for inclusion in the slide-based visual presentation.

9. The system of claim 8, wherein the signal data associated with the user comprises signal data pertaining to usage, by a user account associated with the user, across a plurality of applications.

10. The system of claim 8, wherein the signal data associated with the user comprises signal data collected from a profile of a user.

11. The system of claim 8, wherein the method, executed by the at least one processor, further comprises: receiving, through the user interface, a selection of two or more of the plurality of slides from the template; and generating the slide-based presentation to include content for the two or more of the plurality of slides based on the receiving of the selection.

12. The system of claim 11, wherein the method, executed by the at least one processor, further comprises: receiving, through the user interface, a selection of one of the plurality of slides from the template; and generating the slide-based visual presentation based on the selection of one of the plurality of slides.

13. The system of claim 12, wherein the applying of the trained model further comprises retrieving, from the plurality of data service providers, one or more content portions for a sub-topic associated with the selection of one of the plurality of slides, and wherein the generating of the slide-based visual presentation includes the one or more content portions for the sub-topic.

14. The system of claim 8, wherein the applying of the trained model further comprises retrieving, from the plurality of data service providers, content portions associated with the sub-topics, and selecting, for inclusion in the slide-based visual presentation, one or more of the content based on the ranking of relevance of the content.

15. A computer storage media storing computer-executable instructions that, when executed by at least one processor, causes the at least one processor to execute a method comprising:

providing, through a user interface of a visual presentation service, a user interface feature configured to identify that a slide-based visual presentation is to be created from a topic entered through the user interface feature;

receiving a submission of the topic through the user interface feature configured to identify that a slide-based visual presentation is to be created from a topic;

receiving content associated with a search query for the topic from a plurality of data service providers that are connected with the visual presentation service via a distributed network;

applying a trained model configured to dynamically generate the slide-based visual presentation by executing processing operations that comprise:

determining sub-topics for the topic based on a ranking of relevance that is generated by the trained model during evaluation of the content received from the plurality of data service providers, wherein the trained model generates the ranking of relevance of the content based on an entity evaluation of the content relative to the topic and an evaluation of signal data associated with the user, and generating a content layout for the slide-based visual presentation based on the ranking of relevance of the content generated by the trained model, wherein the content layout comprises a plurality of slides that are each a sub-topic of the sub-topics determined by the trained model; and presenting, through the user interface based on the content layout, a template of the slide-based visual presentation that presents the plurality of slides as slide suggestions for the slide-based visual presentation, wherein multiple of the plurality of slides are selectable for inclusion in the slide-based visual presentation.

16. The computer storage media of claim 15, wherein the signal data associated with the user comprises one or more selected from a group consisting of: signal data associated with the user comprises signal data pertaining to usage, by a user account associated with the user, across a plurality of applications and signal data collected from a profile of the user account.

17. The computer storage media of claim 15, wherein the method further comprising: receiving, through the user interface, a selection of two or more of the plurality of slides from the template; and generating the slide-based presentation to include content for the two or more of the plurality of slides based on the receiving of the selection.

18. The computer storage media of claim 17, wherein the method further comprising: receiving, through the user interface, a selection of one of the plurality of slides from the template; and generating the slide-based visual presentation based on the selection of one of the plurality of slides.

19. The computer storage media of claim 18, wherein the applying of the trained model further comprises retrieving, from the plurality of data service providers, one or more content portions for a sub-topic associated with the selection of one of the plurality of slides, and wherein the generating of the slide-based visual presentation includes the one or more content portions for the sub-topic.

20. The computer storage media of claim 15, wherein the applying of the trained model further comprises retrieving, from the plurality of data service providers, content portions associated with the sub-topics, and selecting, for inclusion in the slide-based visual presentation, one or more of the content based on the ranking of relevance of the content.

\* \* \* \* \*